United States Patent
Boys

(10) Patent No.: US 6,483,202 B1
(45) Date of Patent: Nov. 19, 2002

(54) CONTROL OF INDUCTIVE POWER TRANSFER PICKUPS

(75) Inventor: John Talbot Boys, Birkdale (NZ)

(73) Assignee: Auckland Uniservices Limited (NZ)

( * ) Notice: Subject to any disclaimer, the term of this patent is extended or adjusted under 35 U.S.C. 154(b) by 0 days.

(21) Appl. No.: 09/554,638

(22) PCT Filed: Nov. 16, 1998

(86) PCT No.: PCT/NZ98/00166

§ 371 (c)(1), (2), (4) Date: Jul. 24, 2000

(87) PCT Pub. No.: WO99/26329

PCT Pub. Date: May 27, 1999

(30) Foreign Application Priority Data

Nov. 17, 1997 (NZ) ................................................ 329195

(51) Int. Cl.⁷ .................................................. H02J 3/06
(52) U.S. Cl. ......................................... 307/17; 307/104
(58) Field of Search ........................ 307/17, 401, 412, 307/413, 414, 415, 422, 423, 104

(56) References Cited

U.S. PATENT DOCUMENTS

| | | | |
|---|---|---|---|
| 4,800,328 A | * | 1/1989 | Bolger et al. .................. 320/2 |
| 4,802,080 A | | 1/1989 | Bossi et al. |
| 4,833,337 A | * | 5/1989 | Kelley et al. .................. 307/11 |
| 4,833,338 A | * | 5/1989 | Bartlett et al. ................. 307/17 |
| 5,163,173 A | * | 11/1992 | Casagrande .................. 323/335 |
| 5,207,304 A | | 5/1993 | Lechner et al. |
| 5,293,308 A | | 3/1994 | Boys et al. |
| 5,426,409 A | * | 6/1995 | Johnson ...................... 336/178 |
| 5,450,305 A | | 9/1995 | Boys et al. |

FOREIGN PATENT DOCUMENTS

EP 0253345 1/1988

* cited by examiner

*Primary Examiner*—Fritz Fleming
(74) *Attorney, Agent, or Firm*—Saliwanchik, Lloyd & Saliwanchik

(57) ABSTRACT

Secondary resonant pickup coils (102) used in loosely coupled inductive power transfer systems, with resonating capacitors (902) have high Q and could support large circulating currents which may destroy components. A current limit or "safety valve" uses an inductor designed to enter saturation at predetermined resonating currents somewhat above normal working levels. Saturation is immediate and passive. The constant-current characteristic of a loosely coupled, controlled pickup means that if the saturable section is shared by coupling flux and by leakage flux, then on saturation the current source is terminated in the saturated inductor, and little detuning from resonance occurs. Alternatively an external saturable inductor (1101, 1102) may be introduced within the resonant circuit (102 and 902), to detune the circuit away from the system frequency. Alternatively DC current may be passed through a winding to increase saturation of a saturable part of a core. As a result, a fail-safe pickup offering a voltage-limited constant-current output is provided.

7 Claims, 4 Drawing Sheets

CONTROL OF INDUCTIVE POWER TRANSFER PICKUPS

TECHNICAL FIELD OF THE INVENTION

This invention relates to inductive power transfer; more particularly to loosely coupled systems for inductive power transfer, and in particular this invention relates to protection means for limiting the amount of current circulating in a secondary pickup coil of an inductive power transfer system.

BACKGROUND

The general structure of an inductive power transfer installation is that there is a primary conductor (or more) energised with alternating current, and one or more secondary or pickup devices which intercept the changing flux surrounding the primary conductor and convert this flux into electrical energy by means of windings. Often the pickup devices are mobile, and move alongside, or sometimes (if internal energy storage is available) away from the primary conductors.

There appears to be at least two distinct groups of inductive power transfer systems amongst the published literature. One group uses a "spread-out transformer" approach for the primary trackway, in which a series of iron laminations is used along the full length of the trackway to enhance coupling of the flux to an adjacent set of laminations comprising the flux concentrating means used to cause the collected flux to traverse the (sometimes) resonant pickup windings. The energising frequency is relatively low (from mains frequency up to about 5 kHz). Often the primary trackway is buried in a road and faces upwards to link with pickups beneath a road vehicle that face downwards. This approach provides tight coupling, and power is received essentially as if it arrives from a constant-voltage source. Examples of this type of approach are illustrated in a series of patent specifications from Bolger (e.g. U.S. Pat. No. 4007817 or FIG. 1 of U.S. Pat. No. 4800328). Klontz et al ( U.S. Pat. No. 5157319) describes an alternative tight coupling, involving a coaxial winding transformer secondary encircling a primary conductor.

Our group uses as the primary trackway an elongated loop formed from a parallel pair of conductors, without ferri/ferromagnetic material, and flux is coupled through the core (which does include ferri/ferromagnetic material) to the windings of the resonant pickup coil. This coupling is described as loose. Some versions of the track are provided with lumped resonance elements. The delivery of power is controlled by decoupling at the pickup, using a number of disclosed techniques, and because the system uses a resonant circuit as part of the pickup, the current At produces appears to come from a constant-current source. The energising frequency is relatively high (10–30 kHz), and in some examples the primary trackway is mounted upon a conveyer rail, facing sideways to couple with pickups upon self-powered conveyer units, although it is in other instances embedded within a roadway. This type of approach is illustrated in a series of patent specifications from Boys & Green, commencing with WO 92/17929.

For a comparison of these two approaches refer to FIGS. 14 and 15, and also a conventional transformer (FIGS. 12 and 13), in terms of transformer equivalent circuits. (All FIGS. 12–17 are prior art). FIG. 12 shows an ordinary, tightly coupled transformer having a primary winding 1201 and a secondary winding 1202. FIG. 13 shows the transformer equivalent circuit, where winding 1301 represents the coupled flux M, winding 1302 represents the leakage flux about the primary, and 1303 represents the leakage flux about the secondary. The value of M is obtained from M=k $\sqrt{L_1 L_2}$ where k is typically 95% or more. FIG. 14 shows a loosely coupled inductive power transfer pickup, with primary conductors 103 and 104, a core 300, and a resonant circuit comprising inductor 1401 and capacitor 1402. Considering FIG. 15, the equivalent inductance 1504 (M) represents the power coupling (shared) component of the flux while 1503 is the leakage flux (such as the flux radiated from the core of the pickup while it is carrying a significant resonating current). For loosely coupled systems having a primary pathway in air, the ratio of inductors 1503:1504 is typically 0.7:0.3 whereas for the iron-cored primary with iron-cored secondary devices of Bolger and others the ratio is typically more like 0.2:0.8. In FIGS. 15 and 17, the trackway (constant-current source 1500 with equivalent inductors 1501, 1502) supplies a constant current. FIG. 16 shows a kind of inductive-power transfer device where winding 1601 is a resonant, controllable winding and 1602 with rectifier 1605 supplies useful power—such as a constant current source for battery charging. Considering the transformer equivalent circuit of FIG. 15, the value of the short circuit current (if the output was to be shorted) is $$I_{sc} = \frac{IM}{L_{1503} + M}$$

where M is the inductance of 1504.

We have devised a battery charger which employs loosely coupled inductive power transfer, the subject of patent application PCT/NZ97/00053. Considering a practical circuit from the battery charger in transformer equivalent form, as shown in FIGS. 16 and 17; items 1705 and 1706 represent leakage inductance from the actual windings; 1705 for the large number of turns in the resonating/control winding, and 1706 for the power collection winding. The relative proportions of L in FIG. 17 are: 1504=30%, 1503=65%, 1705=c. 5%., and 1706=c. 5impedance of the primary section as seen looking back from the inductors 1503, 1504 (=95% of L) can then be derived by assuming that a short circuit is placed at 1708 (dashed line) and is $$Z = \frac{(5\%L + X_c)95\%L}{5\%L + X_{c_{res}} + 95\%L + 5\%L} = \infty$$

Since the denominator at resonance is zero then Z is infinite; thereby providing the basis for stating that the source acts as a current source. A Bolger type circuit is equivalent to FIG. 13. The no-load voltage will be determined by the output impedance Z=$L_{1303}$+$L_{1302}$ when driven from a voltage source as is done in Bolger type circuits. The output impedance is Z=$L_{1303}$+$L_{1301}$ if the circuit were to be driven from a current source.

While the constant-current characteristic of this type of inductive power transfer system is generally an advantage, it does impose a risk should a pickup coil enter a state in which there is no control over the amount of current collected. A perfect constant-current source will have no voltage limit. An uncontrolled current resonating in a resonant secondary circuit forming part of a loosely coupled inductive power transfer system may build up to reach high levels if the circuit Q is large, whereupon a number of adverse results may occur, such as component failure, for example by overheating or breakdown of semiconductors or of dielectrics within resonating capacitors and apart from loss of function this can lead to the development of fire within the pickup device. Our usual methods for controlling secondary current rely on active control apparatus, actively causing a switching action about the resonant secondary when an over-voltage condition is detected by a voltage comparing circuit. Passive limiting, relying perhaps on the inherent bulk properties of materials should be safer than active control means. Reliance on active control can break down when several factors impinge together on a device so that active control becomes least likely to function when it is most needed. Some systems using loosely coupled (i. e. constant-current) inductive power transfer have been employed in situations where extreme reliability is a desired feature. If such systems rely solely on active control to restrict the circulating current, then in the absence of function by the active control it is likely that a catastrophic breakdown will occur.

Bolger and Ng in U.S. Pat. No. 4,800,328 (Jan. 24 1989) described the application of constant-voltage transformer principles to an inductive power transfer device by providing a saturable pickup core. This is a control application. The laminated iron core is intentionally provided with a saturable site of reduced cross-sectional area. During normal operating conditions the core is always saturated to a variable extent and the output from the pickup is limited accordingly by the amount of flux remaining within the core. Furthermore, the resonant frequency is designed to be less than that of the supply voltage at low loads, so that as the core moves into saturation, the resonant frequency rises towards the system frequency; coupling improves and more output (resembling a constant voltage) is available. Cores of this type, driven into saturation will evolve heat from hysteresis losses, and cooling is not provided for in the region of the constriction, so this approach would result in a quite temperature-sensitive output voltage. The inventors have consistently aimed for a constant-voltage approach.

DEFINITIONS

Loosely coupled in relation to the transfer of inductive power means that the proportion of flux actually coupling the primary to the secondary is significantly less than the total magnetic flux present in the region of the coupling structures.

Ferrimagnetic properties occur in ferrite materials, in which the entire ferrite molecule contributes to the magnetic properties. In the main these are comparable to ferromagnetic properties; permeability, saturation, hysteresis, etc. occur in ferrimagnetic materials.

Ferromagnetic properties occur in iron, nickel, cobalt, gadolinium, and dysprosium, and their alloys, in which the magnetic properties reside in the atoms. Useful ferromagnetic materials for this application include powdered iron, sintered iron, amorphous iron wires, laminations of iron, silicon steel, grain-oriented steel; used alone or in combination.

Saturation is a property of ferri/ferromagnetic materials defined as a change in the permeability of the material as a function of the magnetic field, in which the material exhibits a finite capacity to carry a quantity of flux, so that the permeability falls as the field rises. An analogy to saturation is the way that a bath towel can absorb only a limited amount of water, after which the surplus water drips off.

OBJECT

It is an object of this invention to provide an apparatus or a method for controlling an inductive power transfer pickup, or at least to provide the public with a useful choice.

STATEMENT OF INVENTION

In a first broad aspect the invention provides apparatus for controlling an inductive power transfer pickup for use in a loosely coupled inductive power transfer system, said pickup being capable in use of collecting power in the form of a current source from a magnetic flux surrounding a primary conductor when energised with alternating current at a system frequency, wherein the pickup includes active control means capable of controlling an output voltage or output current, and wherein the pickup is a resonant circuit which is resonant at the system frequency, the pickup includes passive means capable of limiting the amount of a resonating current circulating in said pickup at less than a predetermined maximum amount, said passive means comprising at least one saturable inductor having a core; at least a portion of the core being capable of becoming saturated at a predetermined flux density; the saturable inductor being connected so as to carry at least a portion of the resonating current so that the onset of saturation within the core reduces the effectiveness of the collection of power and so causes the amount of the current entering the resonant circuit to be limited.

In a related aspect the invention provides apparatus as previously described wherein the core capable of becoming saturated is comprised of a ferrimagnetic material.

In a related aspect the invention provides apparatus as previously described wherein the core capable of becoming saturated is comprised of a ferromagnetic material.

In a related aspect the invention provides apparatus as previously described wherein the at least one saturable inductor is constructed so that the saturable portion of the core is shared by both a coupling flux and by a leakage flux, so that the onset of saturation causes the amount of coupling flux to be diminished and hence the amount of current entering the resonant circuit from the current source is also diminished and so that the onset of saturation results in a minimal amount of detuning.

In another related aspect the invention provides that at least one saturable inductor is selected to exhibit an onset of saturation within the core at or above a selected current so that the onset of saturation within the core changes the resonant frequency of the pickup and so causes the tuning of the pickup to deviate from the system frequency, thereby reducing the effectiveness of the collection of power and so causing the amount of the current entering the resonant circuit to be reduced.

In another related aspect the invention provides that at least one saturable inductor is constructed so that, when in use, the saturable portion of the core is shared by both a coupling flux and by a leakage flux, so that the onset of saturation causes the amount of coupling flux to be diminished and hence the amount of current entering the resonant circuit from the current source is also diminished and so that the onset of saturation results in a minimal amount of detuning.

In a further related aspect the invention includes a core capable of intercepting the flux; the core having a saturable part having a restricted cross-sectional area capable of exhibiting an onset of saturation at a predetermined flux density so that the efficiency of coupling between the primary conductor and the pickup circuit is reduced if the material becomes at least partially saturated.

In a yet further related aspect the invention provides that the predetermined flux density at which the onset of saturation may occur is determined by selecting a material having known saturation threshold properties from a range of ferrimagnetic or ferromagnetic materials and using an amount of the selected material within a flux-carrying part of the core so that the efficiency of coupling between the primary conductor and the pickup circuit is reduced if the material becomes at least partially saturated.

In a related aspect the invention includes a procedure in which the amount of flux required to reach an onset of saturation is controlled by passing current through one or more additional windings wound over a portion of the core having a predetermined onset of saturation; the windings being capable of carrying a DC current capable of generating a flux within the saturable portion of the core; the DC current being generated by a controller responsive to power pickup conditions during use, so that the efficiency of coupling between the primary conductor and the pickup circuit is thereby controllable.

In a yet further related aspect the invention provides that the saturable inductor is physically separate from an inductor capable of intercepting the magnetic flux, and the saturable inductor is connected within the resonant circuit so that the saturable inductor carries at least a proportion of the total resonating current, and so that the onset of at least partial saturation in the saturable inductor during use causes the resonant frequency of the pickup to move away from the system frequency.

In a second broad aspect the invention provides a method for operating a resonant inductive power pickup device for an inductive power transfer system wherein the magnitude of a circulating resonant current within the pickup device is capable of being limited so as to remain below an intended magnitude as a result of at least partial saturation being reached within a saturable core of an inductor included within the resonant circuit of the device, the limiting process being independent of an active control means, so that a voltage limit is provided.

In a third broad aspect the invention provides a method for operating a resonant inductive power pickup device for an inductive power transfer system, wherein the magnitude of the circulating resonant current within the pickup device is controllable as a result of saturation being caused within a saturable inductor included within the resonant circuit of the device by a magnetising current passed through at least one additional winding; the magnetising current being provided by an active control means.

In a fourth broad aspect the invention provides apparatus for controlling the amount of power within a power pickup device having a secondary pickup inductor, having a ferromagnetic core, included in a resonant circuit, wherein the apparatus employs a physical property (apart from a permeability greater than that of air at normal temperature for non-saturating amounts of magnetic flux) of the core, wherein the physical property is deliberately predetermined so that the core behaves in a manner capable of limiting the pickup of power when operating under conditions outside normal use of the pickup.

In a fifth broad aspect the invention provides apparatus for controlling the amount of power within a power pickup device as described previously, wherein the apparatus includes a ferromagnetic core including in its magnetic circuit at least a portion of material selected to exhibit a preferably reversible reduction in permeability with a rise in temperature; the permeability reaching substantially 1.0 at the Curie point, so that in the event of the core reaching too high a temperature the permeability of the core is reduced, thereby limiting the voltage circulating within the resonant circuit.

In a sixth broad aspect the invention provides a method for operating an inductive power pickup device for an inductive power transfer system wherein the output of the pickup device is controlled as a result of saturation being reached during normal use in a ferromagnetic pickup core within the device.

In a related aspect the invention provides a method for operating an inductive power pickup device for an inductive power transfer system wherein potentially catastrophic circulating resonant currents within the pickup device are limited either as a result of saturation being reached within a ferromagnetic pickup core within the device, so that the inductance of the inductor is altered and the amount of power transferred is reduced.

DESCRIPTION OF FIGURES

The preferred embodiments to be described and illustrated in this specification are provided purely by way of example and are in no way intended to be limiting as to the spirit or the scope of the invention.

PREFERRED EMBODIMENT.

This invention provides means for limiting the amount of power within a power pickup device having as a pickup a secondary inductor using a ferrimagnetic or ferromagnetic core, and forming part of a resonant circuit for a loosely coupled inductive power transfer system. The invention relies on one of the magnetic properties of those types of material, namely an ability to be saturated. In a loosely coupled, resonant secondary type of inductive power transfer system, large magnetic fields are more a result of resonant current that circulates in the high-Q windings 102 during any period when the power being drawn from the pickup is less than the amount of power received as magnetic flux rather than a direct consequence of the magnetic field collected from the primary conductors. It may be regarded as "voltage-sensitive control of a current source". Generally this invention provides a "backup to a controller" or a "safety valve" and it is useful to have a safety valve that relies on an intrinsic property of a material rather than an active control device such as that described in our publication WO92/17929, because an active control device may from time to time fail for any one of a number of reasons.

We will describe a protection process relating to start-up conditions for which saturation, being a passive control means having no "warmup" or "initialisation procedure", is well suited.

It is useful to contrast this invention with normal practice. Although any ferri/ferromagnetic core will of course reach saturation at some level of flux (just as any boiler will blow up if there is no safety valve) this invention relates in particular to a method for determining the maximum allowable output from a loosely coupled pickup and hence to designing the windings and core so that the core will saturate at that maximum output, and the windings cannot deliver a greater output voltage or current than the predetermined maximum. This is the "safety valve" effect. Different inductive power transfer applications will present different ratios of usual running output to maximum allowable output and a "stable" application such as a battery charger may have a ratio closer to 1.0 than an application involving power fed to a motorised conveyance without storage.

Figure 16:
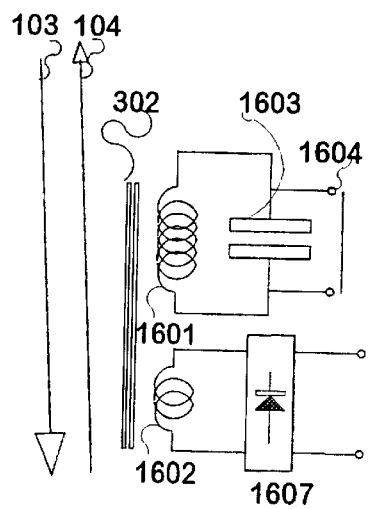

Our preferred active control means use partial decoupling by, in effect, causing a conductive mass to appear within the gap across which inductive power passes from a primary conductor to a secondary conductor. The conductive mass is in fact the shorted secondary pickup (see 1604 in FIG. 16). Shorting the secondary winding would in any case bring any output to zero and shorting is a valid action given a constant-current type of supply. This control means rapidly decreases the amount of voltage coming from the secondary pickup and presents a "magnetically reflective" conductive surface to the magnetic fields emanating from the primary pathway so that any incident flux induces an equal and opposite flux in the shorted winding. An active control involves an electronic circuit typically including a comparator, a driver for a solid-state switch, and the solid-state switch itself and as such requires a power supply and has a finite "settling" or "warm-up" period which may be a weakness. (See example 1). A loosely coupled pickup circuit controlled in this way resembles a constant-current source.

Figure 1:
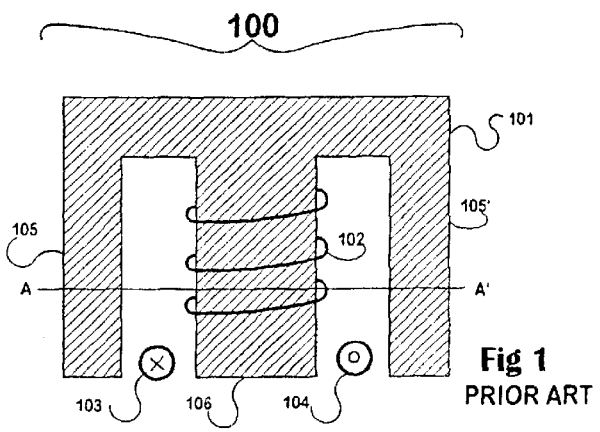
FIG. 1: (and section.
Figure 5:
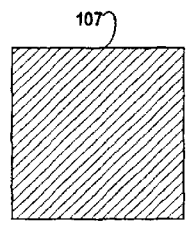
FIG. 5) shows a simplified diagram of a prior-art resonant pickup according to the invention.

In this specification we use the well-known "E" core as our prototype example, although the physical embodiments of inductive power pickup coils can take many shapes and this invention is applicable to all ferri- or ferromagnetic cores. An example of a prior-art ferrimagnetic pickup is shown in FIG. 1, wherein an "E" shaped core is shown in face view at 100, placed in proximity to a pair of primary pathway conductors shown in section at 103 and 104. This pickup includes a ferrite core 101, having a thick central leg 106, around which a pickup coil 102 is wound, and a pair of non-wound limbs 105, 105'. Typically the non-wound limbs have a lesser cross-section than the central limb 106, because all the flux passes through the central limb and hence through the coil around it, while the others each carry only half the flux. In this sheet of drawings, a cross-section of the central core cut at about the section shown as A–A', is shown at the right of the corresponding plan view. A core of this type in a working example of a resonant inductive power transfer secondary pickup does not exhibit saturation under usual working conditions, but if left uncontrolled the circulating (resonant) current may build up to perhaps 20 times the drawn-off current.

There are at least two mechanisms by means of which the effect of saturation can be used to destroy coupling and reduce circulating current. The detuning mechanism acts whenever the onset of saturation causes the core permeability and hence the secondary inductance to decrease, the resonant frequency of the pickup changes, and decoupling occurs by detuning from a pre-existing system-wide resonant frequency. The other mechanism relies on terminating the constant-current source in a short circuit when decoupling is required. Refer to the equivalent transformer circuit of FIG. 15. Reducing (by saturation) the inductance of the shared portion M (1504) of the equivalent circuit has the effect of terminating the constant-current supply entering through 1501, 1502 in a short circuit, whereupon there is no current to pass through 1503 and drive the load. This approach to disabling a constant-current supply by shorting it is preferable to presenting an open circuit, because in that case the voltage will tend to rise indefinitely—or at least until catastrophic failure occurs. The risk of exceeding the ratings of conductors or components, with consequential breakdown, can be minimised because the maximum output in the absence of control is predictable. It is determined mainly by the physical properties of the core (e.g. see FIG. 10) and the number of turns of windings, and so the known maxima can be used when specifying component ratings.

Although these mechanisms may act simultaneously, the detuning effect of saturation of the core associated with M (1504) is small. Detuning may affect other resonant circuits within an inductive power transfer system. Thus we prefer to deliberately locate the saturable portion of the core underneath the windings and the option in which a different saturable material provides the saturable effect is usually to be preferred.

Figure 15:
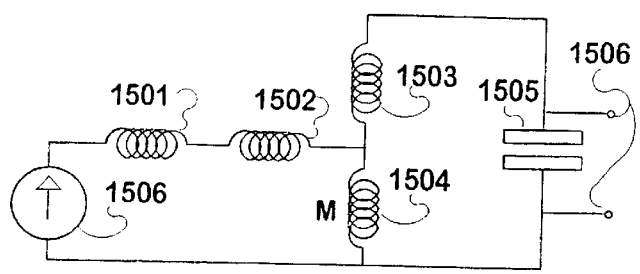
Figure 17:
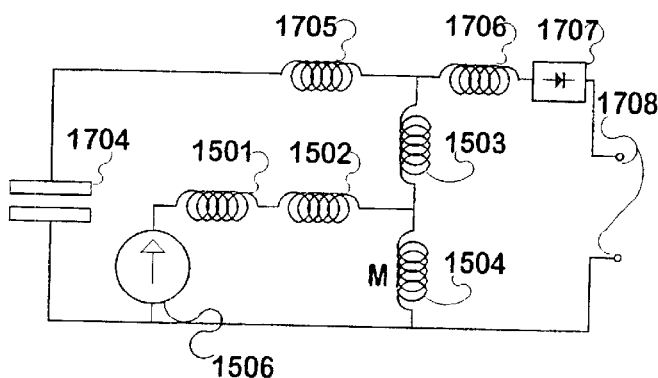

If on the other hand the saturable portion was in inductor 1503 in FIGS. 15 or 17, (representing leakage flux; a saturable collection wing of a flux collecting core) it is clear that only a detuning effect would occur although the constant current input would still seek a sink through the output to the load, which is not as useful as the first option. If the saturable element was inserted in the inductor 1706 supplying the rectifier, saturation would have almost no effect.

The relationship of current versus voltage for a system where the windings surround the saturable core section includes a relatively sharp drop of current with rising voltage in a case where tight coupling exists (see "Illustration" below). Coupled power is proportional to $M^2$. In contrast, an alternative method using a separate saturable inductor (see later) results in a more gradual fall of current with rising voltage because in this case detuning is a dominant factor. That method has other advantages.

Illustration

In a battery charging apparatus (as described in application PCT/NZ97/00053 in which a controlled high-voltage tuned resonant circuit and a low-voltage circuit which simply provides an output are tightly mutually coupled, the onset of saturation provides a sharp reduction in coupling as shown by the onset of a sharp deviation between prediction (the formula itself not including a saturation term) and measurement as the drawn current is reduced toward a saturation point at about 210 A.

$$\text{Formula: } V_{DC} = \left[ \frac{2\sqrt{2}}{\pi} \cdot \frac{V_{AC}}{22} - 0.004 I_{DC} - 0.8 \text{ V} \right]$$

where 22 represents the ratio of turns between the coupled windings, VAC refers to the higher voltage of the control windings which are not the windings responsible for the rectified DC voltage, the $0.004 I_{DC}$ factor represents a leakage flux from wiring and 0.6V represents the forward voltage drop of diodes. The constants in the first term reduce to $0.0409 V_{AC}$.

Table of Results

| $I_{DC}$ | Measured $V_{AC}$ | Measured $V_{DC}$ | Calculated $V_{DC}$ | Discrepancy; diode drop = 0.6 V |
|---|---|---|---|---|
| 0.6 | 466 | 19.5 | 495.7 | |
| 210 | 444 | 17.0 | 16.52 | 0.3 |
| 240 | 414 | 15.4 | 15.10 | 0.1 |
| 255 | 361 | 13.1 | 12.90 | 0.0 |
| 270 | 146 | 4.3 | 4.09 | 0.0 |

Note the abrupt onset of saturation as the drawn-off current falls. (In this example the primary current was constant).

Apparatus

Several example design strategies are now described for putting this invention into practice, and may be used separately or together. For instance, strategy 3 can be applied over strategies 1 or 2 to trim the maximum flux before saturation as an "on-site adjustment" similar to setting a safety valve, and strategy 3 can even be used as a power control means.

Strategy 1

Figure 2:
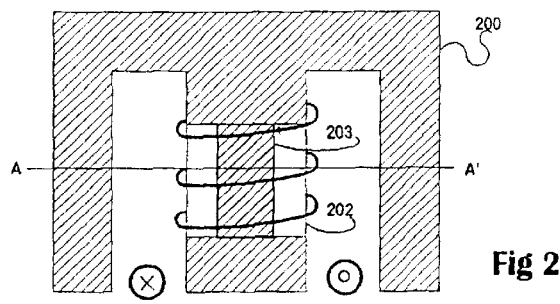
FIG. 2: (and section.
Figure 6:
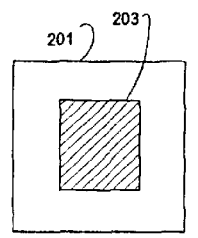
FIG. 6) shows a first version of a resonant pickup according to the invention.

While retaining the "flux collecting" areas of the pickup core as before, provide a reduction of cross-sectional area of the core, preferably at some position within the common flux path. Generally the common position would lie inside the windings of the resonant secondary inductor. See FIGS. 2 and 6. This is a simple approach, although providing a neck or constriction in the core creates a weakened point that may lead to breakage. Cooling means may be provided to fill the space. The first and the second strategies illustrate two ways to reduce the capacity of the core to accommodate a high magnetic flux. FIG. 2 shows that the cross-section 203 of the ferromagnetic core is deliberately reduced from the original cross-sectional area 107—and the actual amount of reduction to provide an upper limit within a particular application may be determined empirically or by calculation; including "edge effects" and the like. A non-magnetic, non-conductive spacing 202 may be retained in order to locate the core 203 in position and/or to act as a support for the windings 102. In FIG. 2 we have shown the same kind of ferrite in use in the constricted portion as in the remainder of the core. However, it could be a different kind of ferrite.

Strategy 2

Figure 3:
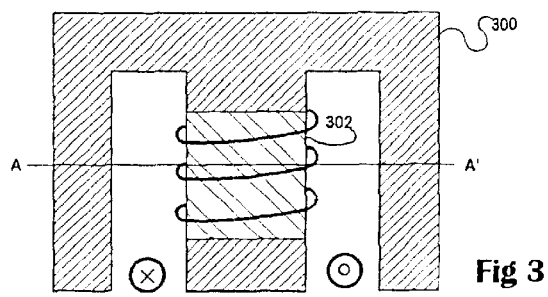
FIG. 3: (and section.
Figure 7:
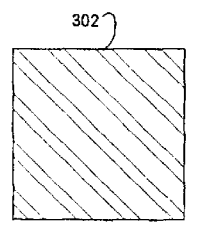
FIG. 7) shows a second version of a resonant pickup according to the invention.

Provide a different type of ferrite at a position preferably within the common flux path; the different ferrite having a more easily saturable property. In FIG. 3 we have shown the substitution of a more easily saturated kind of ferrite material 302 in the common part of the core. The cross-section (FIG. 7) shows that the entire core at this plane is made of this altered material. This approach has the advantage that a preferred easily saturable ferrite, particularly suitable for that purpose, may not be suitable for general use as the entire flux-collecting core. A preferred core material would have a small hysteresis loop as indicated by the area of a is plotted B–H loop because the excursions of B and H are large in a core approaching saturation, and hysteretic losses are converted to heat. Advantages of this strategy are in physical construction and in accurately predicting pickup properties when designing a core. Although one or both legs of the core could be modified in this way, modifying the centre retains symmetry and alters that portion of the core carrying the combined leakage and coupling flux; including the flux resulting from currents in the pickup winding 102.

Strategy 3

Figure 11:
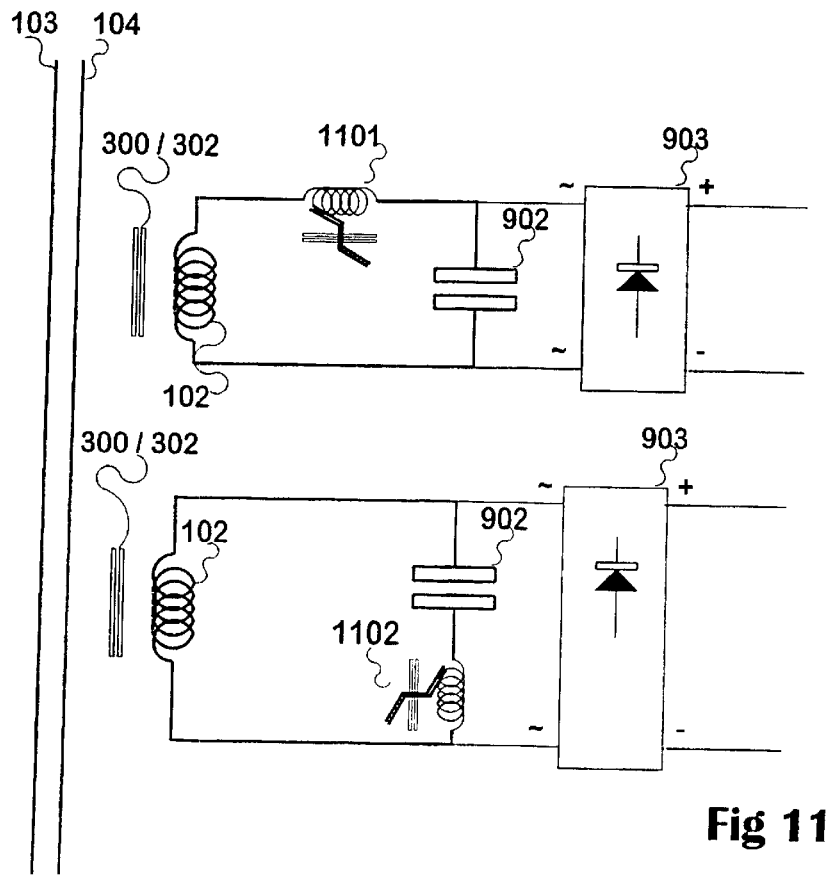
FIG. 11: shows two simplified circuit diagrams for a pickup circuit having a saturable inductor separated from the pickup inductor.

Using a separate saturable inductor particularly as a de-tuning element, connected elsewhere about the resonant circuit (as shown in FIG. 11) has the advantage that the main, flux-collecting core can be optimised for its primary purpose of flux collection and the saturable inductor can be optimised for its primary control purpose.

Strategy 4

Figure 4:
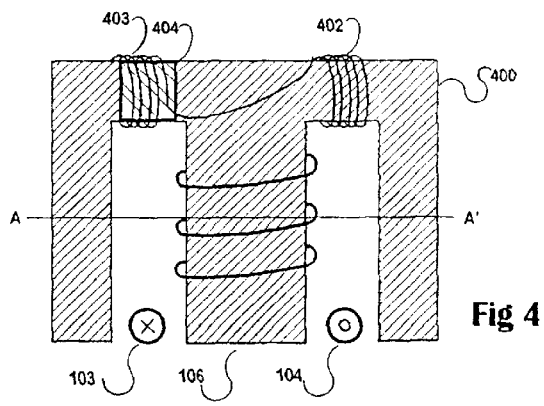
FIG. 4: (and section.
Figure 8:
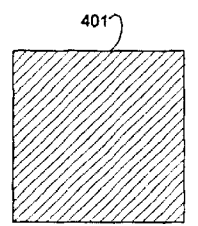
FIG. 8) shows a third version of a resonant pickup according to the invention.

Provide electrical means for saturation of the ferrite, using DC (usually) magnetising currents. FIG. 4 illustrates the principle of active saturation level setting means. Here, windings 402 and 403 can, by carrying DC (or AC) currents affect the saturation of the core by biasing the excursions undergone by the core, as reflected in the B/H curve of the core (or a part of the core) towards one limit or the other. (See FIG. 10A, 10B, or 10C for details). This approach is a combination of protection and control. Optionally, the windings may be placed over more easily saturable zones such as the block 404 of a different ferrite, shown for illustration on one side only of the core of FIG. 4.

Combination Strategies

The fourth or active control strategy can be combined with the previous strategies so that a purely passive system backs up an active, controllable setting. Such a "fail-safe" approach may be mandatory in certain applications.

It is also possible to include an over-temperature protection, which amounts to an alternative type of "safety valve" by including a material which saturates particularly easily with rising temperature. In fact virtually all saturable materials are quite temperature-dependent. Furthermore, it may be possible to exploit the Curie point of a selected material so that at least a portion of the core becomes effectively non-ferromagnetic (the permeability tends to 1.0) when raised above the temperature of its Curie point. Hence overheating of the core or perhaps the surrounding windings results in a reliable cut off of circulating power. Again, it is preferable to place this material beneath the winding (such as 1504). A disadvantage of this method is the slow response time inherent in a process involving heating of a mass; incapable of protection of faster destructive processes such as those applying to excessively reverse biased rectifiers, or to voltage-stressed capacitors.

Any of these strategies tends to result in a state of saturation or loss of ferromagnetic properties within the core of the pickup during circumstances when an amount of power collected by the power pickup device from the primary conductors (source of magnetic flux) 103, 104 significantly exceeds the amount of power drawn from the power pickup. The point at which saturation occurs can be set by design, materials selection, and/or by external saturation means (FIGS. 4 and 10A, 10B, 10C). Preferably the power pickup device retains in ample capacity those portions of the ferromagnetic core which are intended for flux collection. In FIGS. 1–4 they are the ends of the three limbs. These may be extended along the axis of the primary conductors in order to catch more flux.

Figure 9:
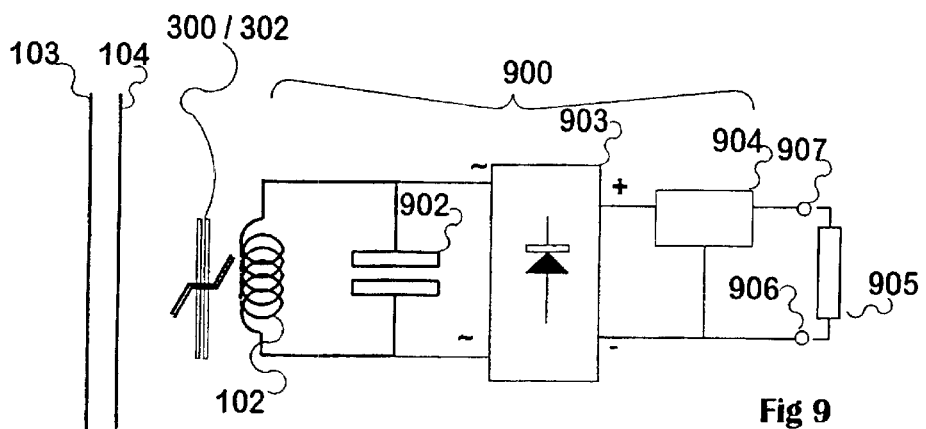
FIG. 9: shows a simplified circuit diagram for a secondary pickup according to the invention, having a predetermined and fixed saturation point.

FIG. 9 shows a circuit diagram for an inductive pickup according to this invention. Here, 103, 104 are primary conductors, and 102 is a secondary coil in a resonant circuit with capacitor 902 at the system frequency. A bridge rectifier 903 draws power from the resonant circuit, through an example power conditioner 904, and to a load 905 connected to terminals 906 and 907. This circuit relies on saturation of the saturable core 300/302 to limit the peak voltage obtainable from the pickup. In effect, the bridge rectifier provides a voltage-limited current source; the voltage of which depends on the level at which saturation occurs. The example power conditioner could for example be a three-terminal linear integrated circuit which, by series or shunt control, produces a constant, regulated output voltage at some voltage less than the input voltage obtained from across the output of bridge rectifier 903.

Figure 10A:
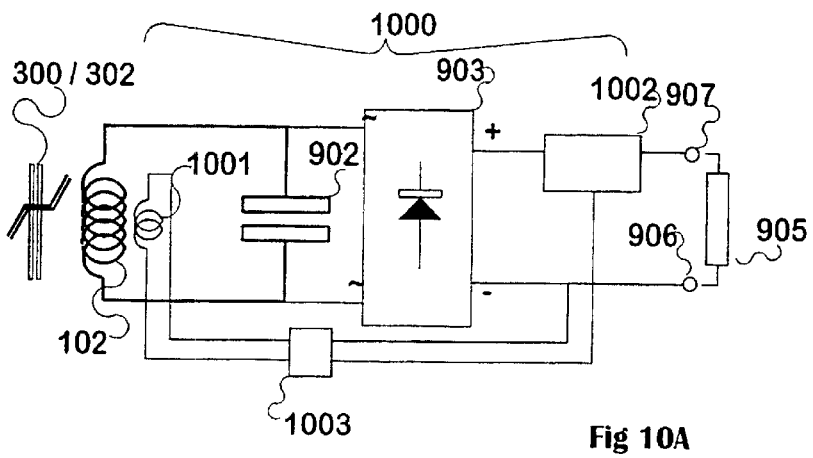
FIG. 10A: shows a simplified circuit diagram for a controllable-saturation secondary pickup according to the invention.

FIG. 10A shows another saturable inductive pickup; in this instance using a separate winding 1001 on the saturable pickup 300/302 as a control means. In this instance, block 1002 is again a controller but its control is exerted by (1) comparing the output voltage against a standard, and if too high (2) passing a greater DC current through means 1003 (for preventing induced AC to pass from the inductor 1001 back to the controller), so that the level at which the core 300/302 becomes saturated is reduced by flux generated by the inductor and the output voltage drops. This is a relatively efficient type of control as compared to a linear series or shunt regulator. This is a form of active control, although it should be designed with a safety valve; the maximum output is set at the point at which the saturable core will saturate even with zero current in windings 1001. In the above, means 1003 is required to block an induced high-voltage AC from windings 1001 because a designer would use a large number of turns in 1001 in order to achieve a high flux density without too high a current.

Figure 10B:
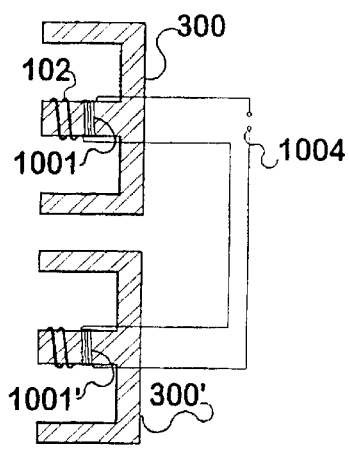
FIG. 10B: shows an application of FIG. 10 to a dual-cored pickup, providing control of the saturation point of a pickup device.
Figure 10C:
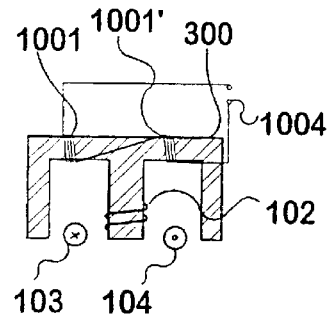
FIG. 10C: shows an application of FIG. 10 to a single E-cored pickup, also including cancellation of induced currents.

FIGS. 10B and 10C show ways for blocking that high voltage AC by cancellation. In FIG. 10B, the voltage developed in winding 1001 about core 300 is opposed by the voltage of opposite phase developed in winding 1001' about a replicated core 300'. 1004 represents connectors to a control unit such as 1002. The power windings 102 are handled in the usual way. FIG. 10C shows a different cancellation means, in which each of windings 1001, 1001' develop a steady flux which may cause local saturation but is more likely to be added within the central leg of the core 300 beneath the main winding 102, but the AC voltage developed in one control winding is cancelled out by the voltage of opposite phase developed in the other. (103, 104 represent the primary conductors in section). Residual filtering (1003) may still be useful.

FIG. 11 shows two example versions of the invention in which the saturable inductor 1101 (in the upper version) or 1102 (in the lower version) is physically and electrically separated from the pickup inductor, yet is included within the resonant circuit. In the configurations shown, the onset of saturation will cause the total inductance of the resonant circuit (comprising 102, 902, and 1101) to fall and hence the resonant frequency will rise, and hence coupling between the track (103, 104) and the pickup will be reduced. The ratio of the inductance of the pickup 102 to the saturable section 1101 should preferably be selected so that saturation is an effective means for detuning the pickup. The advantages of separating the saturable element 1101 from the pickup element 102 include the opportunity of optimising the design of the pickup for a given application. Much of the cost and weight of a pickup device resides in the ferrite components of the pickup inductor core and it is useful to be able to optimise the core with minimal constraints. Also, provision of a saturable element such as a constricted section within the pickup core itself may raise the risk of damage. Furthermore, the saturable element can, if isolated, be selectively cooled with forced air or the like in order to stabilise its properties, and in addition the saturable element may be provided with actively driven control windings as illustrated in FIG. 10A. FIG. 11 draws attention to the common practice of driving more than one pickup or power consumer from the same primary pathway 103, 104 without adverse interactions.

Primary Track Considerations

Many of our existing inductive power transfer systems involve the use of a common system frequency and the primary power supply is run in a self-resonating mode in which the aggregate of resonant frequencies of the primary pathway and various loosely coupled secondary circuits sets the "oscillation" frequency of the power source. A closely similar resonant frequency in all resonant circuits maximises coupling and reduces the risk of frequency hopping or other instabilities. The system-wide resonant frequency is typically 10 to 15 kHz in our installations. If the saturation-based controls used cause detuning, the power supply used for supplying power to the primary inductive pathway is preferably a constant-frequency type, because any change of primary supply frequency could adversely affect other pickups operating along the same primary inductive pathway. Furthermore, if the power supply could "chase" the detuned pickup frequency the control would have no effect. Hence we prefer to rely on manipulation of the shared inductance so as to maximise the dependence of M (1504 in FIG. 15) on saturation while leaving 1503 unaltered, by careful design of the core.

Secondary Regulation Considerations

The constant-current inductive power transfer pickup of a loosely coupled system becomes, in the presence of saturation-based limiting of resonant current, a voltage-limited constant-current source. If the system was always operated in saturation, it may then become a constant-voltage source. This is not energy-efficient, for example because of losses in the saturable core, and it is not stable, because heating caused by losses causes a drift of saturation.

EXAMPLE 1

In a device using inductive power transfer for battery charging purposes the saturated-core pickup design has been designed so that the rectifier diodes are effectively protected from a voltage surge which will otherwise occur at any time that a shorting controller enters the "open" state, or at the initial connection of power. Because a constant-current supply exists, the immediate injection of full power results in a voltage surge because consumption rises more slowly. The rate of rise of current flow from the rectifier to the battery is limited by a series inductance.

The design process in respect of saturation comprises the provision of a core which will saturate, when at a low end of an operating temperature range, before the output voltage exceeds the peak inverse voltage rating of the rectifier diodes used. (The "low temperature" is specified only because the flux density at saturation reduces with increasing temperature). This application uses a bridge comprised of Schottky diodes each having a peak inverse voltage rating of 45V. The number of turns is almost 1 in this instance, and the maximum allowable flux is therefore set to be less than an amount giving 90V per turn (the limit for two diodes in series). In practice we obtain 26V per turn from our prototype transformer. This application of saturation provides instantaneous protection and, being based on material properties, does not require prior activation of active devices.

In this example, the drawn current is relatively predictable and the voltage at which saturation occurs may be set to be only a small amount more than the output voltage. (Other applications such as moving vehicles, having a widely varying load, may require a greater margin between output and saturation).

Figure 18:
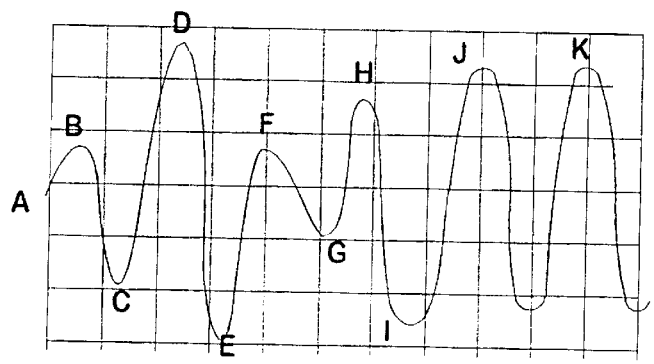
FIG. 18: is an oscillogram drawn from a sampled waveform display, showing the secondary voltage in a battery charger over a short period after starting.

Example measurements are given in FIG. 18 which is a voltage (Y=20V/division) against time (X=c. 150 $\mu$s/division) oscillogram drawn from a sampled waveform display showing the secondary voltage in a battery charger after starting (time A). We observe that the peaks of the first three cycles B, C, D rise in a series, but the fourth peak (E) is only a little greater and the following peaks (F, G, H) are reduced. After the eighth peak (I) the amplitude tends to stabilise. This effect between peaks D to I reflects the onset of saturation and limiting of voltage amplitude after just 3 cycles of applied power. Had the peaks after the third peak continued to rise at the same rate, the rectifier would have been destroyed. (A 12.9 kHz supply; 20V per division vertical.)

Figure 19:
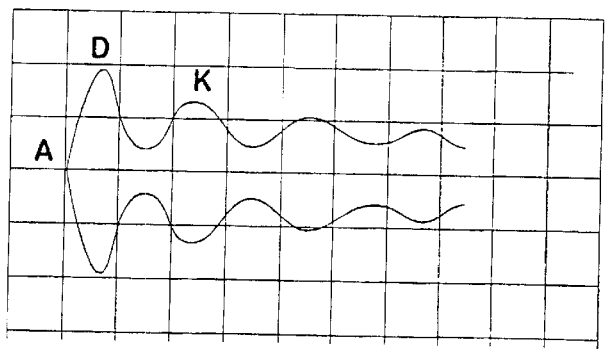
FIG. 19: is an oscillogram drawn from a sampled waveform display, showing the secondary voltage in a battery charger over a longer period after starting.
Figure 12:
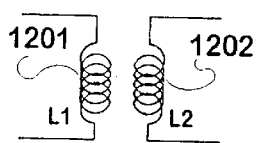
FIG. 12 with FIG. 13: show a conventional and an equivalent transformer circuit for a prior-art conventional transformer.
Figure 13:
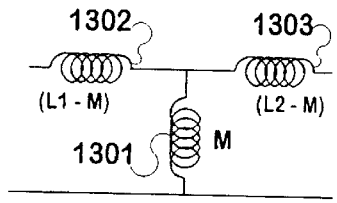
Figure 14:
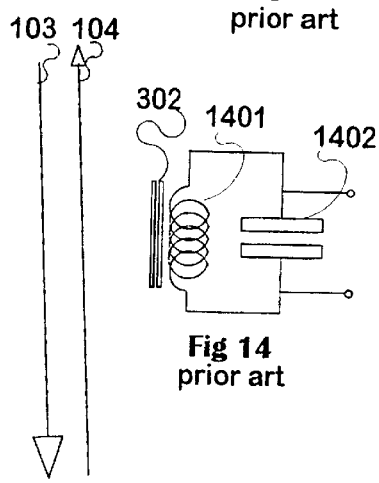
FIG. 14 with FIG. 15: show a conventional and an equivalent transformer circuit for a simple inductively coupled resonant pickup FIG. 16 with FIG. 17: show a conventional and an equivalent transformer circuit for a saturable battery charger having a separate control winding, according to the invention.

A second adverse effect is also controlled by the saturable core. This is the tendency for the circuit comprising the resonating capacitor and the series inductor (not the pickup resonant inductor) to form an undamped resonant circuit and undergo repeated large excursions in flow. The rectifier and the battery form part of this circuit yet have little damping effect. FIG. 19 is a diagram of the waveform envelope of the secondary output (where A, D, and K are the same points as in FIG. 17) showing that the inclusion of a saturable inductor as the resonant inductor results in effective damping of surges in secondary current flow.

Variations

Although the examples relate to an "E" shaped core, and although we use the term "ferrite" in referring to preferred core materials discussed herein, the principles of the invention apply to any configuration and material of any core made of a ferrimagnetic or a ferromagnetic material.

In the case of relatively tightly coupled inductive power transfer systems, the manipulation of coupling by saturation is less useful, but detuning properties may be exploited. The principles described herein also apply to situations in which secondary resonance is not normally exploited and in those, decoupling is the most important mechanism.

Advantages

The proposed secondary current limiting means is passive and relies on the bulk properties of a material. Therefore the invention should have a very reliable fail-safe control feature. Temperature rises, mechanical shocks, fractures, and the like reduce the saturation capacity. Only cooling can increase it. The risk of exceeding any ratings of ancillary components is now brought under control—as in Example 1—regardless of whether active protection circuits have been properly activated. Use of saturation as a control means, as described herein, is a "wattless" kind of control. If the active section fails, the passive saturation limit is reached.

Finally, it will be appreciated that various alterations and modifications may be made to the foregoing without departing from the scope of this invention as set forth in the following claims.

What is claimed is:

1. An apparatus for controlling an inductive power transfer pickup for use in a loosely coupled inductive power transfer system, the pickup collecting power in the form of a current source from a magnetic flux surrounding a primary conductor upon energizing the primary conductor with alternating current at a system frequency, wherein the pickup comprises means for controlling an output voltage or output current at a value above a working range of said output voltage or output current, for safety purposes, and wherein the pickup is a resonant circuit which is resonant at the system frequency, wherein the pickup comprises passive means for limiting the amount of a resonating current circulating in said pickup at less than a predetermined maximum amount, said passive means comprising at least one saturable inductor having a core, wherein at least a portion of the at least one saturable inductor exhibits an onset of saturation within the core at or above a selected current so that the onset of saturation within the core changes the resonant frequency of the pickup and so causes the tuning of the pickup to deviate from the system frequency, thereby reducing the effectiveness of the collection of power and so causing the amount of the current entering the resonant circuit to be reduced.

2. The apparatus according to claim 1, wherein the at least one saturable inductor is constructed so that, when in use, the saturable portion of the core is shared by both a coupling flux and by a leakage flux, so that the onset of saturation causes the amount of coupling flux to be diminished and hence the amount of current entering the resonant circuit from the current source is also diminished and so that the onset of saturation results in a minimal amount of detuning.

3. The apparatus according to claim 2, wherein the core has a saturable part having a restricted cross-sectional area capable of exhibiting an onset of saturation at a predetermined flux density so that the efficiency of coupling between the primary conductor and the pickup circuit is reduced if the material becomes at least partially saturated.

4. The apparatus according to claim 3, wherein the predetermined flux density at which the onset of saturation is determined by selecting a material having known saturation threshold properties from a range of ferrimagnetic or ferromagnetic materials and using an amount of the selected material within a flux-carrying part of the core so that the efficiency of coupling between the primary conductor and the pickup circuit is reduced if the material becomes at least partially saturated.

5. The apparatus according to claim 4, wherein the amount of flux required to reach an onset of saturation is controlled by passing current through one or more additional windings wound over a portion of the core having a predetermined onset of saturation; the windings being capable of carrying a DC current capable of generating a flux within the saturable portion of the core; the DC current being generated by a controller responsive to power pickup conditions during use, so that the efficiency of coupling between the primary conductor and the pickup circuit is thereby controllable.

6. The apparatus according to claim 2, wherein the saturable inductor is physically separate from an inductor capable of intercepting the magnetic flux, and the saturable inductor is connected within the resonant circuit so that the saturable inductor carries at least a proportion of the total resonating current, and so that the onset of at least partial saturation in the saturable inductor during use cause the resonant frequency of the pickup to move away from the system frequency.

7. The apparatus according to claim 4, wherein the amount of flux required to reach an onset of saturation is controlled by passing current through one or more additional windings wound over a portion of the core having a predetermined onset of saturation; the windings being capable of carrying a DC current capable of generating a flux within the saturable portion of the core; the DC current being generated by a controller responsive to power pickup conditions during use, so that the efficiency of coupling between the primary conductor and the pickup circuit is thereby controllable.

* * * * *

UNITED STATES PATENT AND TRADEMARK OFFICE
CERTIFICATE OF CORRECTION

PATENT NO. : 6,483,202 B1 Page 1 of 1
DATED : November 19, 2002
INVENTOR(S) : John Talbot Boys It is certified that error appears in the above-identified patent and that said Letters Patent is hereby corrected as shown below:

Column 1,
Line 40, "( U" should read -- (U --.
Line 52, "At" should read -- it --.

Column 2,
Line 40, "=c. 5impedance" should read -- c. 5%.  The impedance --.

Column 9,
Line 13, "VAC" should read -- V $_{AC}$ --.

Column 10,
Line 9, "a is plotted" should read -- a plotted --.
Line 38, "Optionally ," should read -- Optionally, --.

Column 15,
Line 9, "cause" should read -- causes --.

Signed and Sealed this

Nineteenth Day of August, 2003

JAMES E. ROGAN
*Director of the United States Patent and Trademark Office*